United States Patent
Girardin et al.

(10) Patent No.: US 11,821,457 B2
(45) Date of Patent: *Nov. 21, 2023

(54) RAPID-RELEASE ANCHOR AND FITTING

(71) Applicant: VALEDA COMPANY, Oakland Park, FL (US)

(72) Inventors: Patrick Girardin, Fort Lauderdale, FL (US); Roberto Ansourian, Cooper City, FL (US); Jonathan Garcia, Oakland Park, FL (US)

(73) Assignee: VALEDA COMPANY, Oakland Park, FL (US)

( * ) Notice: Subject to any disclaimer, the term of this patent is extended or adjusted under 35 U.S.C. 154(b) by 1373 days.

This patent is subject to a terminal disclaimer.

(21) Appl. No.: 16/224,703

(22) Filed: Dec. 18, 2018

(65) Prior Publication Data

US 2020/0191185 A1    Jun. 18, 2020

(51) Int. Cl.
*F16B 5/06* (2006.01)

(52) U.S. Cl.
CPC .................................. *F16B 5/0621* (2013.01)

(58) Field of Classification Search
CPC ...... B60P 7/0807; B60P 7/0815; F16B 21/06; F16B 21/09; F16B 5/06; F16B 5/0607; F16B 5/0621; F16B 5/0642; F16B 5/0664; Y10T 403/59; Y10T 403/591; Y10T 403/593; Y10T 403/595; Y10T 403/599; Y10T 403/60; Y10T 403/602; Y10T 403/606; Y10T 403/608
See application file for complete search history.

(56) References Cited

U.S. PATENT DOCUMENTS

| | | | | | |
|---|---|---|---|---|---|
| 4,586,399 | A | * | 5/1986 | Kassai | B62B 9/20 403/108 |
| 4,688,843 | A | * | 8/1987 | Hall | A61G 3/0808 410/105 |
| 6,585,465 | B1 | * | 7/2003 | Hammond | B60P 7/0815 410/104 |
| 6,644,901 | B2 | * | 11/2003 | Breckel | B61D 45/001 410/104 |
| 7,185,862 | B1 | | 3/2007 | Yang | |

(Continued)

OTHER PUBLICATIONS

Apr. 29, 2020 Communication in PCT/US2019/066978 (including Provisional Opinion Accompanying the Partial Search Result).

(Continued)

*Primary Examiner* — Jonathan P Masinick
(74) *Attorney, Agent, or Firm* — Daniel Tallitsch

(57) ABSTRACT

The embodiments described and claimed herein are rapid-release anchors and fittings for securing equipment to a surface of a vehicle. The embodiments described and claimed herein utilize a surface-mountable anchor capable of releasably engaging with a fitting. The anchor has channel with an open top end and an open bottom end that allow the anchor to be received and removed in both directions, up and down. The anchor includes a locking mechanism that is configured to permit single-handed insertion of the fitting into the anchor. Also disclosed herein are systems comprising multiple anchors and fittings that serve as brackets for the securement of larger devices, cabinets, handles and other pieces of equipment within a vehicle.

17 Claims, 8 Drawing Sheets

(56) References Cited

U.S. PATENT DOCUMENTS

| | | | | |
|---|---|---|---|---|
| 7,874,774 | B2* | 1/2011 | Peterson | B60P 7/0815 |
| | | | | 410/104 |
| 8,308,115 | B2* | 11/2012 | Goto | B60N 3/103 |
| | | | | 24/453 |
| 10,077,024 | B2* | 9/2018 | Depondt | B60S 1/3851 |
| 10,307,313 | B2* | 6/2019 | Schroeder | F16M 11/2078 |
| 11,339,919 | B2* | 5/2022 | Garcia | F16M 11/041 |
| 2006/0024129 | A1* | 2/2006 | John | F16B 2/00 |
| | | | | 403/329 |
| 2006/0153635 | A1* | 7/2006 | Underwood | E04C 5/163 |
| | | | | 403/329 |
| 2006/0263163 | A1* | 11/2006 | Harberts | B61D 45/001 |
| | | | | 410/104 |
| 2007/0154257 | A1* | 7/2007 | Guttormsen | F16B 7/0433 |
| | | | | 403/329 |
| 2010/0123062 | A1* | 5/2010 | Jones | F16M 11/16 |
| | | | | 248/220.21 |
| 2012/0126075 | A1 | 5/2012 | Chinn et al. | |
| 2014/0205371 | A1* | 7/2014 | Bally | A61G 12/008 |
| | | | | 403/361 |
| 2014/0374564 | A1 | 12/2014 | Schroeder et al. | |

OTHER PUBLICATIONS

US Cargo Control Single Stud Fitting and Anchor Point, 2" Round L-Track Anchor Point Tie Down—Black (see https://www.uscargocontrol.com/Round-Airline-Track-2-inch-Piece_2).

Jun. 24, 2020 International Search Report and Written Opinion in PCT/US2019/066978.

* cited by examiner

RAPID-RELEASE ANCHOR AND FITTING

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND

Technical Field

The embodiments described and claimed herein relate generally to methods, systems, and devices for securing equipment. In one embodiment an anchor and fitting mount are adapted for securing medical equipment to a surface, such as the surface of an ambulance or other vehicle.

Background Art

Ambulances rely on securement systems to secure medical equipment to the walls and other surfaces of the vehicle during daily operation. These systems are required to firmly restrain the equipment in the event that the vehicle undergoes any sudden maneuvers or crashes. These systems must also maximize the amount of medical equipment that can be stored in the vehicle, while providing enough space for the emergency medical personnel to navigate throughout the vehicle. An ideal securement system would also allow for rapid release and attachment of the medical equipment to provide more efficiency during emergencies.

Current ambulance equipment storage systems, which generally include shelves, cabinets, and systems of vertical securement straps and carabiner clips, suffer several drawbacks. Wall-mounted cabinets or shelves are bulky and oversized and reduce the storage capacity of the ambulance, as well as available space for emergency medical personnel. Additionally, only equipment that fits within the dimensions of the individual shelves or cabinet drawers can be stored. A system of restraints and carabiners allows for storage of a wider range of equipment. However, these systems are typically strenuous and time-consuming to use. In securing a heavy piece of equipment to the wall, an ambulance operator is required to lift the device for securement against the wall and to hold it in place while attaching each individual carabiner clip to the desired point of connection. The operator is unable to attach the device to the wall in one movement and instead must hold it in place until every necessary connection is formed. The requirement of a secondary lifting for removal of that device can also impose similar hazards as the securement steps must be reversed.

Accordingly, there is a need for an improved securement system for securing equipment to vehicle surfaces.

BRIEF SUMMARY

The embodiments described and claimed herein solve at least some of the problems of the prior art vehicle-securement systems. In simple terms, the embodiments described and claimed herein utilize a surface-mountable anchor capable of releasably engaging with a fitting. The anchor includes a channel with two open ends, which allow the fitting to be inserted and removed from either end. In one embodiment the channel has an open front end defining a slot, and includes undercuts on either side of the slot that are configured to slidingly receive track engaging members on the fitting. The fitting can be locked and released from the anchor bi-directionally, meaning the fitting can approach the channel from both open ends of the anchor, and can be removed from the channel from both open ends of the anchor. However, blocking structures can be included to allow the fitting to approach and be removed from only one end of the anchor.

In some embodiments, once the fitting is fully inserted into the channel, a locking structure disposed in the channel engages a corresponding locking structure on the fitting to prevent further movement of the fitting. The anchor additionally comprises a locking member that is coupled with the locking structure to move the locking structure between locked and unlocked positions. In one embodiment, the locking member can be spring-loaded, whereby the locking structure is biased into the locked position. In one embodiment, the locking structure on the anchor is a male engagement portion, such as a projection, and the corresponding locking structure on the fitting is a female engagement portion, such as a blind hole or any other structure that receives the male engagement portion. When the locking member positions the male member into engagement with the female member, the fitting cannot be moved relative to the anchor. Conversely, when the release member positions the male portion out of engagement with the female portion, the release member is positioned to allow the fitting to move in two directions along at least one axis.

The fitting has an attachment point for receiving and holding a load. The attachment point may include at least one bore for receiving a connecting member such as a screw or bolt. In another embodiment of this concept, the attachment point may be a ring capable of interlocking with a carabiner clip. In other embodiments, the attachment point may be any other type of connecting member, including a post or a hook. The attachment point may be disposed on the opposite face of the fitting relative to the female engagement portion described above, and may be configured to be disposed in the slot as the fitting translates through the channel of the anchor.

Also disclosed in this application are systems comprising multiple anchors and fittings that can secure larger devices, cabinets, handles, and other pieces of equipment within a vehicle. For example, one system includes two anchors, fixed to a wall, and a handlebar connected at opposite ends to two fittings.

Another system for securing a larger device comprises two anchors and two corresponding fittings, with a remote release for simultaneously disengaging the two sets of anchors and fittings. In one embodiment of this system, a pivotable handle is coupled to the locking members of the two anchors via rigid arms that pivot with the handle and manipulate the locking members between locked and unlocked positions. The rigid arms may have a telescoping feature to accommodate custom arrangements of the anchors on the vehicle surface. In particular, anchors that are grouped and arranged in different configurations can be locked or released in unison by the handle. In another embodiment of this concept, the handle may be coupled to the locking members via cables.

These and additional embodiments described and claimed below provide faster securement and release time than prior art vehicle securement devices. The bi-directional locking feature allows for an ergonomic installation for various applications, such as on a wall for a downward lock and release, or any other combination of insertions or removals relevant to the environment. These embodiments also provide devices that are less bulky and cumbersome than standard vehicle-securement devices and that can store a wider variety of equipment in a more efficient manner that standard vehicle-securement devices.

Other embodiments, which include some combination of the features discussed above and below, and other features which are known in the art, are contemplated as falling within the claims even if such embodiments are not specifically identified and discussed herein.

BRIEF DESCRIPTION OF THE SEVERAL VIEWS OF THE DRAWINGS

These and other features, aspects, objects, and advantages of the embodiments described and claimed herein will become better understood upon consideration of the following detailed description, appended claims, and accompanying drawings where:

Figure 1:
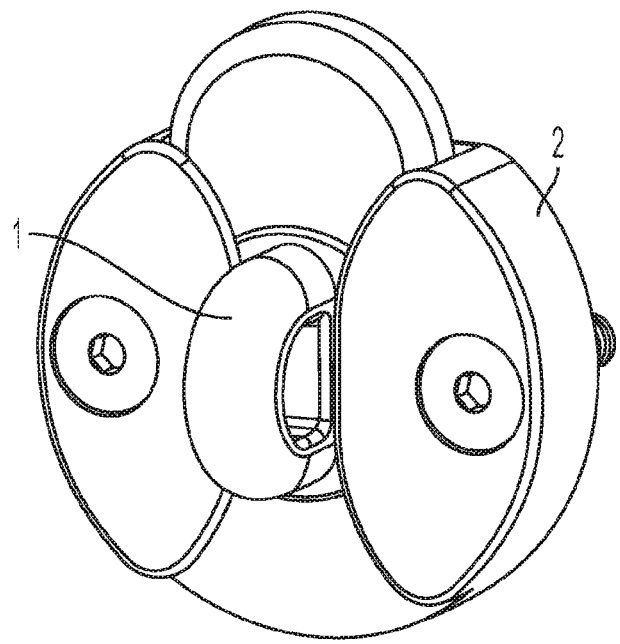
FIG. 1 is a first perspective view illustrating a first embodiment of a rapid-release anchor and fitting.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein, or which render other details difficult to perceive, may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION

A first embodiment of a rapid-release anchor and fitting is illustrated in FIGS. 1-5. The rapid-release anchor and fitting includes a fitting 1 capable of releasably engaging with a surface-mountable anchor 2.

Figure 2:
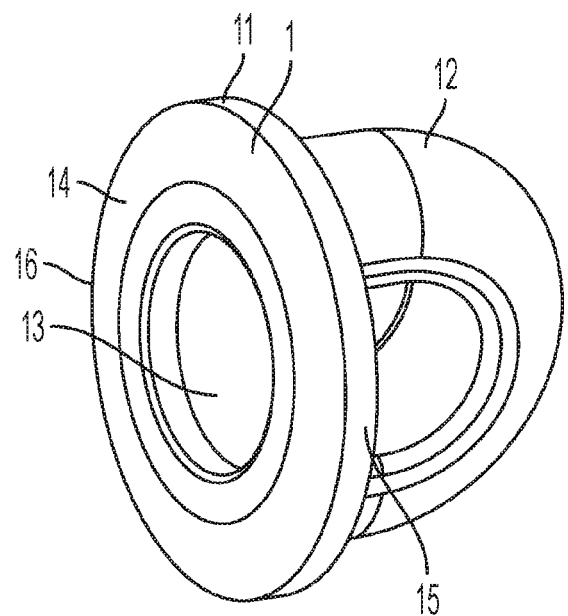
FIG. 2 is a second perspective view illustrating the fitting of the first embodiment.

As best shown in FIG. 2, the fitting 1 may be comprised of a channel engaging member 11 with an attachment member 12 on one face and a first locking structure 13 on the opposite face. The track engaging member 11 may be a plate, such as a circular disc, as shown, or other shape that is compatible with the anchor 2. For example, the track engaging member need not be circular and could simply be comprised of two laterally extending members, such as a first track engagement member 15 and a second track engaging member 16 that extend from opposite sides of the channel attachment member 12, wherein each of the first and second track engagement members 15, 16 are configured to be received in corresponding undercuts 215, 216 in the anchor 2. The attachment member 12, may be a ring, as shown, that is designed to connect to a carabiner or other load-bearing clip. Alternatively, the attachment member 12 could take the form of a post or hook, or could comprise a threaded hole adapted to receive a threaded fastener. The first locking structure 13 may be a blind hole, as shown, wherein the blind hole is designed to engage with the anchor 2 to lock the fitting 1 in place on the anchor 2, as described in more detail below.

Figure 3:
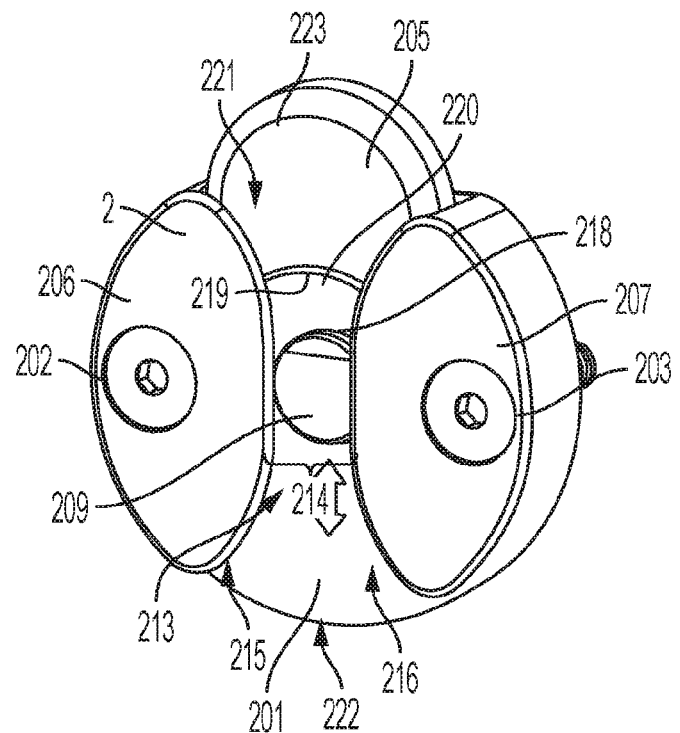
FIG. 3 is a third perspective view illustrating the anchor of the first embodiment.
Figure 6:
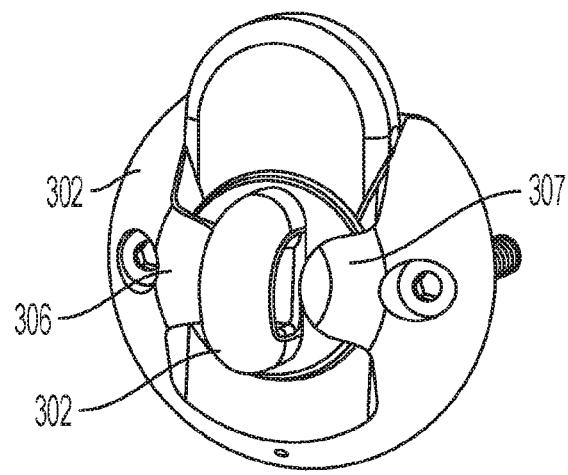
FIG. 6 is a perspective view illustrating a second embodiment of a rapid-release anchor and fitting.

As best shown in FIG. 3, the anchor 2 may be comprised of an anchor plate 201 with one or more bores 202, 203 for receiving bolts that connect the anchor 2 to a vehicle wall or other surface, a locking member 205, and two retaining members 206, 207. The two retaining members 206, 207 may be generally L-shaped and extend away from the anchor plate 201 and inward (toward each other) from opposite sides of the anchor plate 201, whereby the anchor plate 201 and shoulder members 206, 207 collectively to form a channel 213 with an open slot 214 extending from a top open end to a bottom open end. As such, the channel 213 may slidingly receive the fitting 1 from one or both of the top open end 221 and bottom open end 222, whereby the first and second track engaging members 15, 16 of the fitting 1 will be received by the undercuts 215, 216 in the anchor 2. The width of the slot 214 is less than both the width of the anchor plate 201 and the fitting, whereby the first and second track engaging members of the fitting 1 are able to slide under the retaining members 206, 207 into the undercuts 215, 216, whereby the retaining members 206, 207 and anchor plate 201 collectively restrict movement of the fitting 1 along the z-axis and the x-axis when the fitting 1 is slid into the channel 213. The retaining members 206, 207 can take a variety of shapes and sizes. FIG. 6, for example, illustrates an alternative design for an anchor 302, where the retaining members 306, 307 are smaller and extend over smaller arcs of the fitting 301. In this respect, the fitting 301 will have the ability to rotate about a limited range of angles, both clockwise and counterclockwise from the position shown in FIG. 6.

Figures 4, 5:
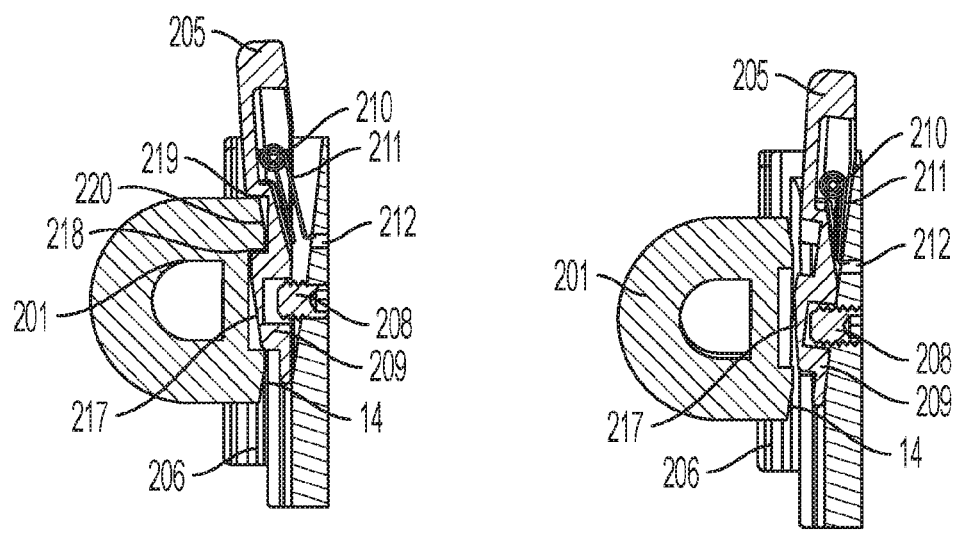
FIG. 4 is a first cross-sectional view of the first embodiment of the rapid-release anchor and fitting with the retaining member of the anchor engaged with the fitting.
FIG. 5 is a second cross-sectional view of the first embodiment of the rapid-release anchor and fitting with the retaining member of the anchor disengaged from the fitting.

The locking member 205 is provided to restrict movement of the fitting 1 along the y-axis. The locking member 205 has an unlocked position, whereby the fitting 1 can translate in the channel 213 along the y-axis, and a locked position, whereby the fitting is precluded from translating in the channel along the y-axis. The locking member 205 may be spring-loaded and pivotably coupled to the anchor plate 201 by a set screw 208. The locking member 205 has a release portion 223 at a top end which, in this case, is a button that may be depressed to disengage the anchor 2 and fitting 1, or to allow the fitting 1 to be inserted into the channel 213 of the anchor 2. The locking member 205 also has a second locking structure 209 at a bottom end, where in the second locking structure 209 is disposed within the channel 213 and is configured to engage with the first locking structure 13 on the fitting 1. More particularly, as shown, the second locking structure 209 may be a projection and the first locking structure 13 may be a blind hole, wherein the projection lockingly engages in the blind hole to secure the fitting 1 to the anchor 2 as shown FIG. 4. Depressing the locking member 205 causes the projection to disengage from the blind hole, as shown in FIG. 5. Notably, the projection may include a chamfered surface 217, whereby the locking member 205 (and projection) will be automatically depressed when the fitting 1 is slid into the channel 213 from the bottom open end 222, and the projection will automatically engage with the blind hole when the fitting 1 is fully slid into the channel 213. The channel engaging member 11 can be provided with a complementary chamfered edge 14 to assist in depressing the locking member 205 during insertion of the fitting 1 into the anchor 2. When inserting the fitting 1 into the anchor 2 from the upper open end 221, the locking member 205 can be manually depressed by the user, or pushed into the depressed position by the fitting 1 itself.

To improve the positive engagement between the projection and the bind hole, the locking member 205 can include an annular-shaped channel 220 defined by walls 218, 219, wherein the annular-shaped channel 220 is designed to receive an annular portion of the track engaging member 11. More particularly, when the fitting 1 is secured in the anchor, the wall 218 will abut an inner wall of the blind hole, and the wall 219 will abut an edge wall of the track engaging member 11, restricting movement of the track engaging member 11 along at least the y-axis, both up and down, as best shown in FIG. 4. To provide the locking member 205 with a spring action that biases the locking member 205 in a locked condition (see FIG. 4), a pin 210 may be disposed on an underside of the locking member 205, wherein one end of a spring 211 is coiled around the pin 210, while the other end of the spring 211 is connected to the anchor plate 201 by means of a hole 212 formed in the anchor plate 201.

Notably, it is contemplated that the first locking structure 13 can take the form as a projection and the second locking structure 209 can take the form as a blind hole. In yet other embodiments, the first locking structure 13 and second locking structure 209 can take the form of any other complementary locking structures.

For the reasons previously mentioned, the fitting 1 can translate through the channel 213 only when the locking member 205 is moved to an unlocked position. In the first embodiment, the locking member 205 can be moved to the unlocked position by depressing the release portion 223 by force exerted by the fitting 1 as it is pushed across the channel 213 against the locking member 205, or by force applied to the release portion 223 of the locking member 205 towards the anchor plate 201, such as by the user's hands. As the user slides the fitting 1 over the projection, the locking member 205 will automatically move to the locked position through spring action, thereby manipulating the projection into engagement with the blind hole 13 on the fitting 1. As illustrated in FIG. 4, if the blind hole is aligned with the projection while the locking member is disposed in its normal, biased (locked) position, the projection will be engaged with the blind hole and the interference fit between the two will hold the fitting in place, preventing movement of the fitting 1. However, as illustrated in FIG. 5, when the locking member 205 is placed in the unlocked position, the fitting 1 can move up and down along the y-axis in the channel, even when the blind hole is aligned with the projection. When the projection and the blind hole are engaged (FIG. 4), a piece of equipment secured to the attachment member 12 of the fitting 1 will be fixed to a surface of the vehicle. When the projection and the blind hole are disengaged (FIG. 5), the fitting 1 can be removed by sliding action, one or both of up and down, and the piece of equipment secured to the surface of the vehicle can be detached.

Figure 7:
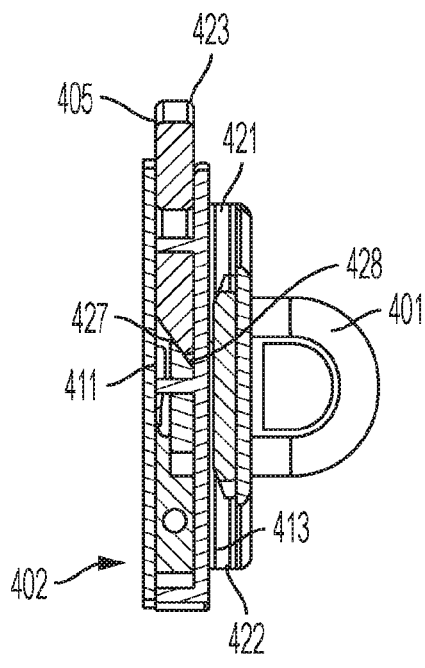
FIG. 7 is a first side cross-sectional view of a third embodiment of a rapid-release anchor and fitting.
Figure 8:
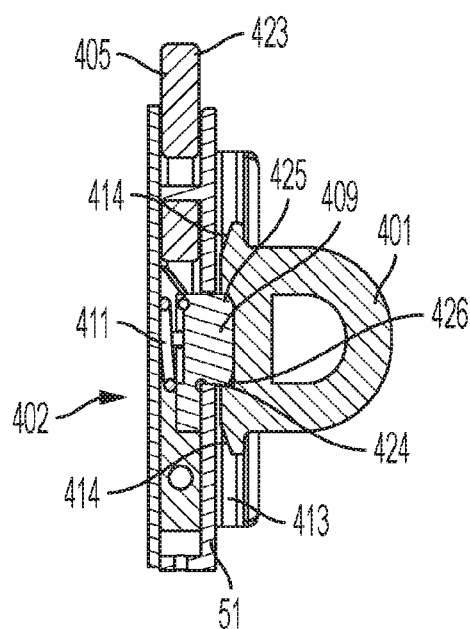
FIG. 8 is a second side cross-sectional view of the third embodiment of the rapid-release anchor and fitting.

FIGS. 7-8 illustrates a third embodiment of an anchor 402 and fitting 401, where the channel 413 is formed in a plane in front of the locking member 405 and the second locking structure 409 extends through a hole 424 in the center of the channel 413. In this embodiment, the locking member 405 is formed of separate structures that collectively have a locked position and an unlocked position. In particular, the locking member 405 includes a release portion 423, the second locking structure 409, and a spring 411. The release portion 423 is in the form of a button that may be depressed in the downward direction to move the locking member 405 from the locked position to the unlocked position. The release portion 423 includes an angled surface 427 that cooperates with a corresponding angled surface 428 on the second locking structure 409, whereby the second locking structure moves from the locked condition shown in FIG. 8 to an unlocked condition behind the channel 413 (not shown) when the release portion is depressed downward. By virtue of the spring 411, which is disposed between the back plate of the anchor 402 and the second locking structure 409, the locking member 405 is biased into the locked position. In addition, because the locking member 405 is disposed behind the channel 413, rather than in front of the channel 413, it is easier to insert the fitting into the channel from the top open end 421. As best shown in FIG. 8, the second locking structure 409 has both a chamfered top edge 425 and a chamfered bottom edge 426 (which may, in the case of a circular second locking structure, be continuous about the perimeter). The chamfered top edge 425 will cooperate with a complementary chamfered edge 414 on the fitting 401 to cause the second locking structure 409 to be depressed when the fitting 401 is inserted into the channel from the top open end 422. Similarly, the chamfered bottom edge 426 will cooperate with a complementary chamfered edge 414 on the fitting 401 to cause the second locking structure 409 to be depressed when the fitting 401 is inserted into the channel from the bottom open end 422.

In the first through third embodiments, the fitting can be inserted and removed from the anchor bi-directionally, meaning that the fitting can be inserted from either the top end or the bottom end of the anchor, and removed from either the top end or the bottom end of the anchor. This feature allows for an ergonomic installation for various applications, such as on a wall for a downward lock and a downward release, or any other combination of insertions or removals relevant to the environment. In fact, the entire system, including the anchor and the fitting, is compact and easily mounted onto a wall, making it practical to install several units in a vehicle. A further benefit of this configuration is that because the locking mechanism is housed in the stationary wall anchor, as opposed to the fitting, the fitting can be composed of a lighter weight material than the anchor, allowing it to be easily attached to EMT bags or other medical equipment, devices, cabinets or additional accessories. In addition, placing the locking mechanism on the surface-mounted anchor eliminates the need for the user to simultaneously hold the weight of the equipment, which can be substantial, and manipulate a locking member on the fitting.

Figure 9:
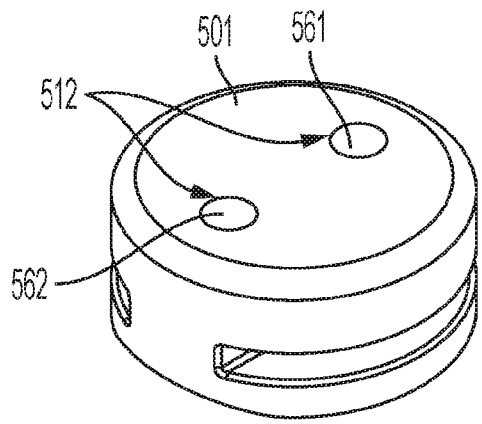
FIG. 9 is a perspective view of a fourth embodiment of a rapid-release fitting.
Figure 10:
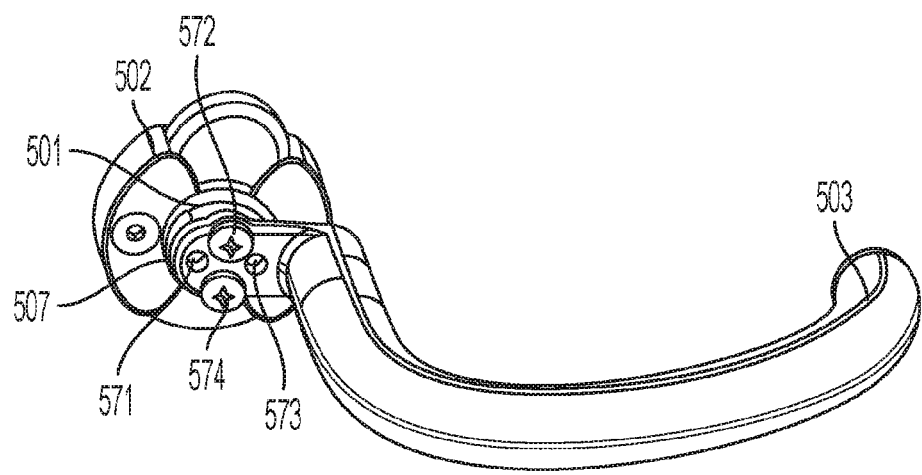
FIG. 10 is a perspective view illustrating a fifth embodiment of a rapid-release anchor and fitting with a handlebar.
Figure 11:
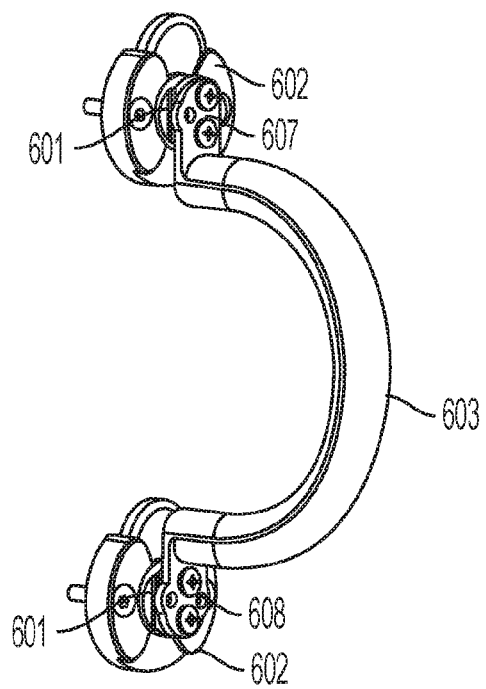
FIG. 11 is a perspective view illustrating a sixth embodiment of a rapid-release anchor and fitting with a handlebar.

In further embodiments, the fitting design can be customized to secure different types of equipment. For example, in a fourth embodiment, illustrated in FIG. 9, the attachment member 512 can take the form of one or more bores 561, 562 for receiving bolts or screws. The bore 561, 562 may be through bores, and may include internal threads. With this configuration, an equipment securement device, or the equipment itself, can be bolted or screwed to the fitting and secured by the rapid release anchor. For example, FIG. 10 illustrates an fifth embodiment of the anchor 502 and fitting 501 system where the fitting 501 is bolted to the base 507 of a handlebar 503. In particular, the base of the handlebar 503 may include one or more complementary bores, in this case four bores 571, 572, 573, 574, that can be aligned with the bores 561, 562 on the fitting 501 to receive one or more fasteners. As shown, the bores 571, 572, 573, 574 are disposed in a diamond configuration, which allows the handle to be bolted to the fitting 501 in either a horizontal configuration (shown in FIG. 10), or a vertical configuration. In cases where the handlebar needs to be capable of handing high loads, the handlebar 603 could be provided with multiple bases 607, 608, one on each end, for attachment to two fittings 601 and two anchors 602, as shown in FIG. 11 in a sixth embodiment.

Figure 12:
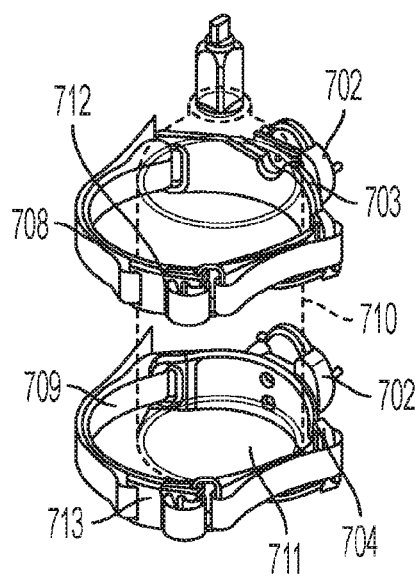
FIG. 12 is a perspective view illustrating a seventh embodiment of a rapid-release anchor and fitting with a bottle holder.

Multiple rapid-release anchor and fitting securement systems can secure larger devices, cabinets, handles and other pieces of equipment within a vehicle. For example, as discussed previously, in FIG. 11, a system of two rapid-release anchors 602 and corresponding fittings 601 are used to secure a handlebar 603 to a surface. FIG. 12 illustrates another securement system comprising multiple anchors and fittings. In this embodiment, two anchors 702 may be mounted to a vehicle surface. Each corresponding fitting (obscured) may be bolted to a top and bottom portion 703, 704 of a bottle holder, which may be the same as or similar to the bottle holder disclosed in U.S. Pat. No. 9,975,492, which is incorporated by reference herein. Each of the top and bottom portions 703, 704 include a belt 708, 709 that can extend around a piece of equipment, such as bottle 710. The bottom portion 707 may includes a supporting plate 711 disposed under the base of the equipment 710. Additionally, each belt 708, 709 may include a buckle 712, 713 for adjusting the tightness of the belt 708, 709 around the piece of equipment 710. The piece of equipment 710 can be fixed to the wall by mating the fittings to the corresponding wall-mounted anchors 702. To remove the equipment 710, the user can manipulate the locking member and slide the fittings out of the anchors 702.

Figure 13:
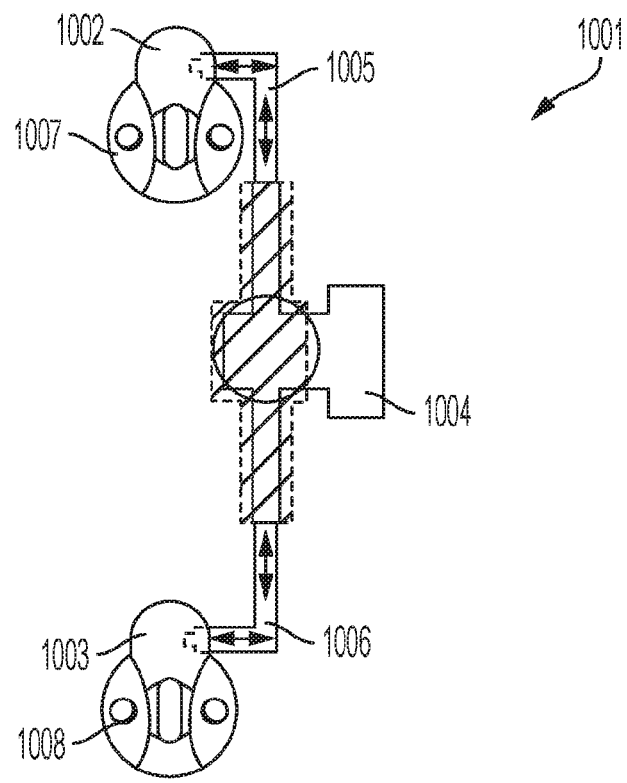
FIG. 13 is a perspective view illustrating a first embodiment of a common release mechanism for multiple rapid-release anchor and fittings.
Figure 14:
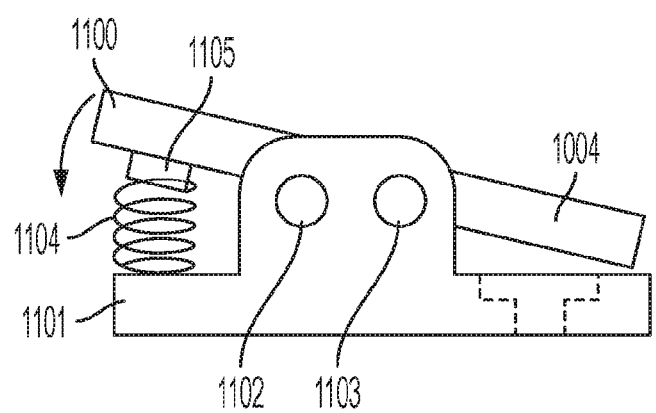
FIG. 14 is a side view of the first embodiment of the common release mechanism.

In yet other embodiments, anchor and fitting units that are grouped and arranged in different configurations may be locked or released in unison via a common multi-release or multi-lock mechanism 1001 of FIGS. 13-14. The multi-lock mechanism 1001 may be used to manipulate the locking members 1002, 1003 of multiple anchors into the release (unlocked) positions simultaneously. The multi-lock mechanism 1001 may include a handle 1004 that is remotely located relative to the locking members 1002, 1003, and is operable by hand. The multi-lock mechanism may also include two or more manipulating members 1005, 1006 that are coupled to and extend from either side of the handle 1004. The manipulating members 1005, 1006 may be L-shaped, as shown in FIG. 13, and may have one or more telescoping features on each portion of the "L", so as to facilitate custom spacing between the respective anchors 1007, 1008 and lateral spacing between the locking members 1002, 1003 and the handle 1004. The end of each manipulating member 1005, 1006 abuts or is attached to the locking member 1002, 1003. The multi-lock mechanism 1001 has a pivot, in the case of FIG. 13 located along the longitudinal axis of the manipulating members 1005, 1006, which allows the handle 1004 to pivot towards the user relative to the anchors 1007, 1008 and allows the ends of the manipulating members to pivot toward the mounting surface of the anchors 1007, 1008, thereby moving the locking 1002, 1003 to the unlocked position as it pivots. This handle configuration can accommodate multiple anchors spaced at variable distances from each other, allowing for greater flexibility in the placement of the anchor assemblies and easier simultaneous release of multiple anchor and fitting units. In this embodiment, a spring-loaded locking pin 1103 may be used to fix each locking mechanism 1100 in an unlocked position to free up the users hands during installation of the equipment onto the anchors 1007, 1008. As illustrated in FIG. 14, the handle 1004 is connected to a base member 1101 by a hinge pin 1102 (which forms the pivot axis) adjacent to the spring-loaded locking pin 1103. A spring 1104 biases the handle 1004 into the locked condition shown in FIG. 14. More particularly, the spring 1104 is disposed between the base member 1101 and a column 1105 extending from the bottom side of the handle 1004, on the opposite side of the hinge pin 1102 from the gripping portion of the handle 1004. When the user pulls the handle 1004 away from the mounting surface (up in FIG. 14), the spring-loaded locking pin 1103 will move underneath the gripping portion of the handle 1004 and keep the handle 1004 (and the associated locking members 1002, 1003) in an unlocked position. To place the handle 1004 (and the associated locking members 1002, 1003) back into the locked position, the user can simple pull the pin 1103, and the spring 1104 will urge the handle 1004 back to its original, locked state shown in FIG. 14.

Figure 15:
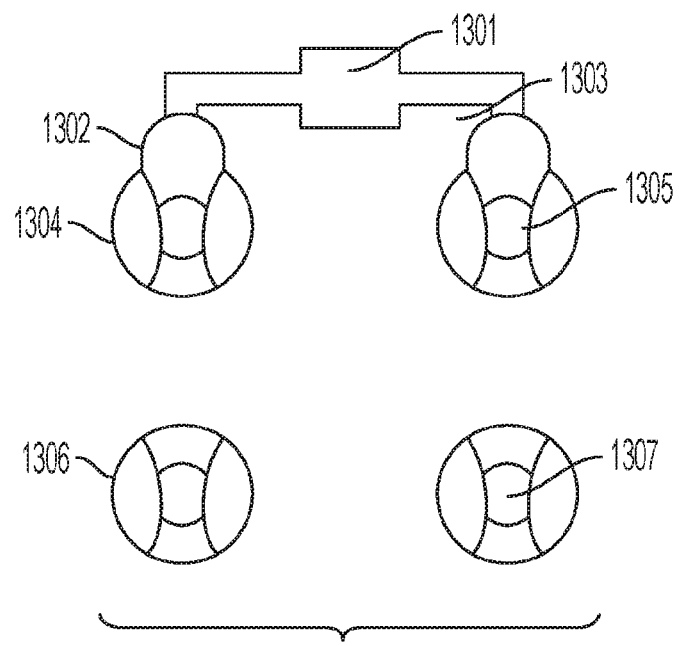
FIG. 15 illustrates a first embodiment of a non-locking anchor.
Figure 16:
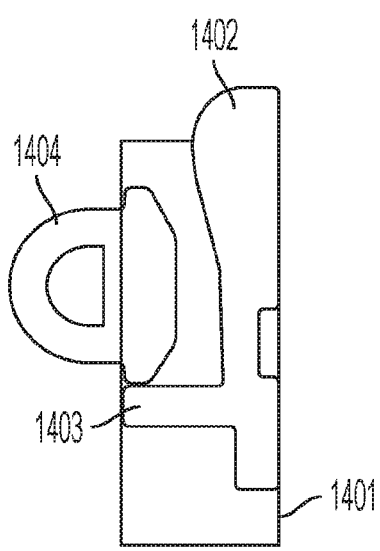
FIG. 16 illustrates a side cross-sectional view of a second embodiment of a non-locking anchor.

The embodiment illustrated in FIG. 13 can be used alone in either a vertical orientation, as shown, or a horizontal orientation. The embodiment of FIG. 13 can also be used in multiples, for example, in a mirrored orientation to provide a system comprising four anchors. In addition, the embodiment of FIG. 13 can be used in combination with a pair of non-locking anchors, as shown in FIG. 15. In the system of FIG. 15, a multi-release mechanism 1301 is connected to the locking members 1302, 1303 of the top horizontal pair of wall-mounted anchors 1304, 1305. The bottom pair of anchors 1306, 1307 do not contain a locking member. However, the retaining members of the bottom anchors still restrict movement of the corresponding fittings along the x-axis and the z-axis. In all other respects, the anchors 1306, 1307 may be the same or similar to the other anchors 1304, 1305. In this configuration the user need only activate the single multi-release mechanism 1301 to release the equipment collectively supported by the anchors 1304, 1305, 1306, 1307. FIG. 16 illustrates a second embodiment for a non-locking anchor, where the non-locking anchors 1401 contain a non-locking tab 1402 with a projection 1403 that prevents the passage of the fitting 1404 through the bottom open end of the anchor 1401. In that respect, the fitting must be inserted and removed through the top open end of the anchor 1401. It is contemplated that the projection 1403 can be included in a locking anchor as well, to require insertion and removed through the top open end.

Figures 17, 18:
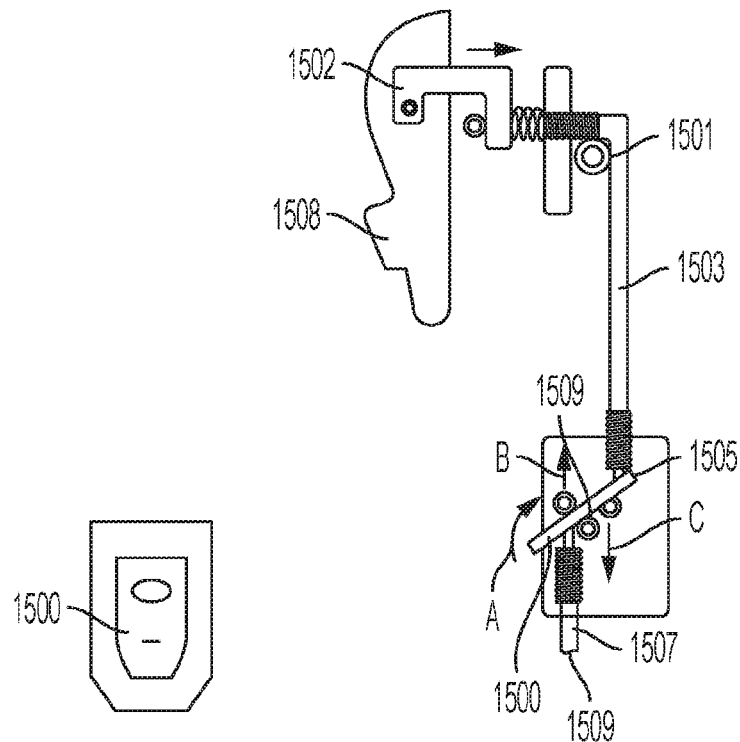
FIG. 17 is a front view that illustrates a second embodiment of a common release mechanism for multiple rapid-release anchor and fittings.
FIG. 18 is a side view of the second embodiment of the common release mechanism.
Figure 19:
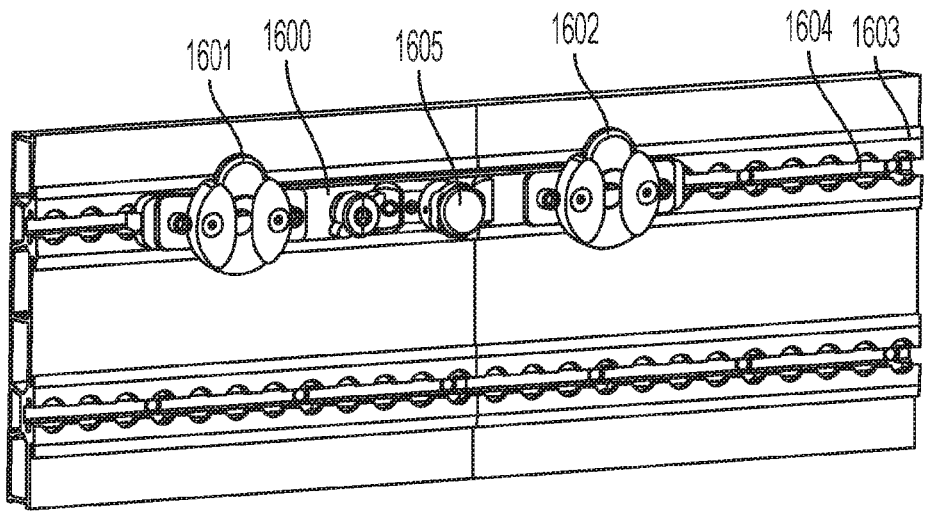
FIG. 19 is a perspective view of a system of anchors used in conjunction with a mounting track and mounting track fitting.

FIGS. 16-17 illustrate a cable-based multi-puck release apparatus. The apparatus comprises a paddle handle 1500 that can be mounted to the vehicle floor, wall, or other structure. The pull handle 1500 is, in essence, a pivoting member that pivots about axis 1509. The paddle handle may be connected to one or more pull cable assemblies 1501, 1507 that link the pull handle 1500 to the locking member 1508 of an anchor. More particularly, each pull cable assembly 1501, 1507 comprises a cable 1503 that is secured at one end to the paddle handle 1500 and at the other end is secured to a link member 1502. The link member 1502, in turn, is connected to the lock member 1508 of an anchor. Pulling on the paddle handle 1500 in direction A causes the cable 1503 of a first pull cable assembly to be pulled in direction C, and the cable 1509 of a second pull cable assembly 1507 to be pulled in direction B. In this respect, the paddle handle is capable of unlocking a series of anchors. When the paddle handle 1500 is released by the user, the springs located in the anchors will cause the locking members 1508 to return to their locked state. The paddle handle 1500 may include a time delay mechanism that holds the anchors in an unlocked condition for a predetermined period of time, similar to the paddle handle disclosed in U.S. Pat. No. 7,452,170, which is incorporated herein by reference.

FIG. 18 illustrates a system where one or more rapid-release assemblies 1601, 1602 may be used in conjunction with a mounting track 1603. The mounting track 1603 can be an L-track fitted to the vehicle floor, such as the L-track disclosed in U.S. Pat. No. 9,937,960. In this embodiment, two rapid release anchors 1601 1602 are bolted to one or more L-track fitting 1600, such as the one disclosed in U.S. Pat. No. 7,637,705, which is incorporated by reference. On the opposite side of the fitting 1600 are a series of lugs corresponding to the slots 1604 in the L track 1603. Once the fitting 1600 is disposed on the L track and the lugs are fitted in the correspond slots 1604, a knob 1605 can be used to activate a locking pin, fixing the fitting 1600 in place. This configuration allows users to more easily switch between different combinations and configurations of the fitting mounts as their needs change.

Other embodiments, which include some combination of the features discussed above and below and other features which are known in the art, are contemplated as falling within the claims even if such embodiments are not specifically identified and discussed herein.

We claim:

1. A securement system comprising:
   a fitting with a first locking structure and an anchor with a second locking structure;
   the anchor having a channel with a first open end opposite a second open end, wherein both the first open end and the second open end are configured to receive the fitting in sliding engagement;
   the second locking structure being disposed in the channel for locking engagement with the first locking structures;
   the anchor includes a locking member for manipulating the second locking structure between a first position, wherein the second locking structure is positioned to engage with the first locking structure, and a second position, wherein the second locking structure is positioned to be disengaged from the first locking structure; and,
   the locking member is pivotally secured to the anchor, wherein the locking member obstructs one of the first open end and the second open end when placed in the first position.

2. The securement system of claim 1, wherein the locking member is configured to be depressed by the fitting as the fitting is inserted into the channel at the one of the first open end and the second open end, thereby manipulating the second locking structure to the second position, whereby the fitting may be engaged with the anchor in a single-handed operation.

3. The securement system of claim 1, wherein the locking member and second locking structure are integrally formed.

4. The securement system of claim 1, wherein the second locking structure is a projection extending from the locking member and the first locking structure is a blind hole that is configured to receive the projection.

5. The securement system of claim 4, wherein second locking structure defines a first wall that prevents translation of the fitting in the channel in a first direction, and the locking member defines a second wall that prevents translation of the fitting in the channel in a second direction, the first direction being opposite from the second direction.

6. The securement system of claim 1, wherein the fitting includes an attachment member intended for connection to a load, wherein the attachment member is disposed on a first face of the fitting and the first locking structure is disposed on a second face of the fitting, wherein the first face is opposite the second face.

7. The securement system of claim 6, wherein the attachment member is a ring.

8. The securement system of claim 6, wherein the attachment point is a bore configured to receive a fastener.

9. The securement system of claim 1, wherein the channel includes a first undercut on a first side of the channel and a second undercut on a second side of the channel, wherein the first side of the channel is opposite from the second side of the channel.

10. The securement system of claim 9, wherein the fitting includes a first track engaging member and a second track engaging member extending away from each other on opposite sides of the first locking structure, the first track engaging member configured to be received in the first undercut and the second track engaging member configured to be received in the second undercut when the fitting is slidingly engaged with the anchor.

11. The securement system of claim 10, wherein the first and second track engaging members collectively form a disc that is received in the channel.

12. The securement system of claim 1 further comprising:
a second fitting adapted for sliding and locking engagement with a second anchor;
the second anchor having a second locking member, each of the locking member and the second locking member having a locked position and an unlocked position;
a remote release member being engaged with the locking member and the second locking member for manipulating the locking member and the second locking member between the locked position and the unlocked position.

13. The securement system of claim 12, wherein the remote release member includes a pivotally mounted handle that, when manipulated by a user, simultaneously moves the locking member and second locking member to the unlocked position.

14. The securement system of claim 13, wherein the remote release member is coupled to the locking member and second locking member via arms that pivot with the handle.

15. The securement system of claim 13, wherein the remote release member is coupled to the locking member and second locking member via a cable.

16. The securement system of claim 12, wherein a spring-loaded locking pin is configured to hold the handle in an unlocked position.

17. The securement system of claim 12, wherein the remote release member includes a time delay mechanism that is configured to hold the locking member and second locking member in the unlocked position for a predetermined period of time.

* * * * *